Sept. 22, 1931.        J. C. WOODSON              1,823,925
                    ELECTRIC HEATING UNIT
                     Filed Oct. 6, 1928
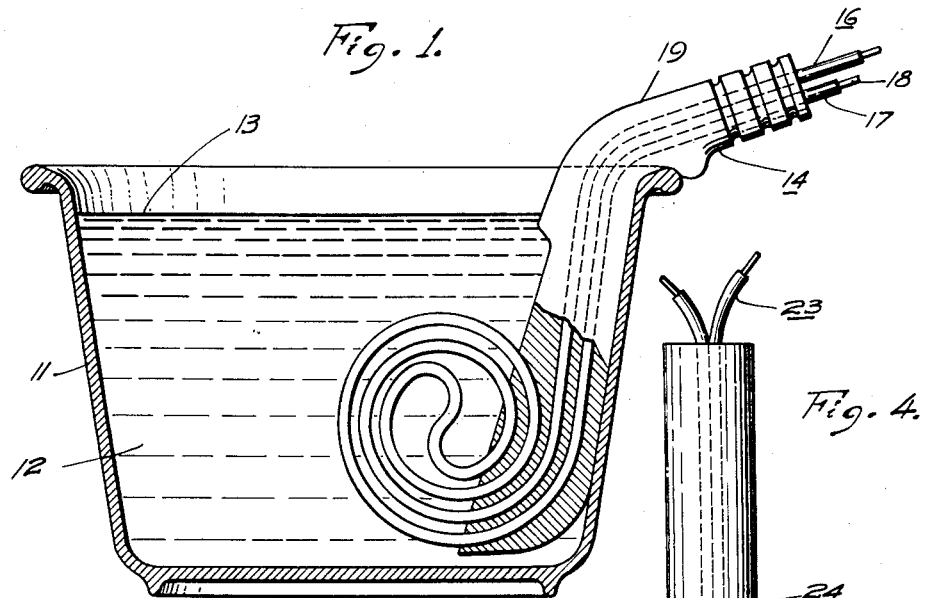
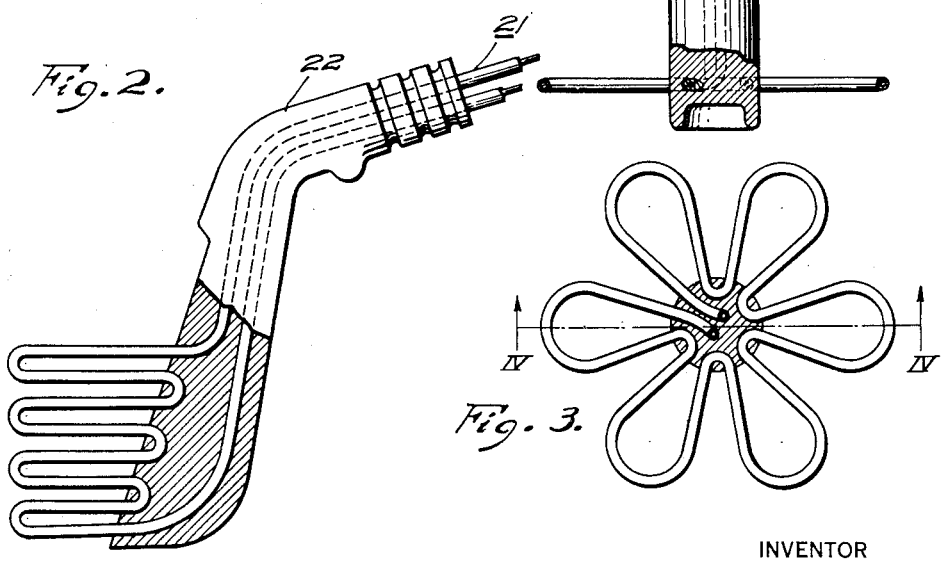
INVENTOR
James C. Woodson.
BY
Chesley G. Carr
ATTORNEY Patented Sept. 22, 1931

1,823,925

UNITED STATES PATENT OFFICE

JAMES C. WOODSON, OF MANSFIELD, OHIO, ASSIGNOR TO WESTINGHOUSE ELECTRIC & MANUFACTURING COMPANY, A CORPORATION OF PENNSYLVANIA

ELECTRIC HEATING UNIT

Application filed October 6, 1928. Serial No. 310,684.

My invention relates to electric heating units and particularly to immersible heating units.

An object of my invention is to provide a relatively light-weight immersion heating unit that shall embody means for preventing corrosive action of a heated fluid thereon and means for maintaining the heating unit in its initial preformed shape.

In practicing my invention, I provide an encased tubular heating element preformed to comprise an elongated portion and a return-bent portion and having a mass of metal cast about the elongated portion and a part only of the return-bent portion.

In the single sheet of drawings,

Figure 1 is a view, mainly in vertical section but partially in side elevation, of an electric heating unit embodying my invention.

Fig. 2 is a view, partially in side elevation and partially in vertical section, of a modified form of heating unit embodying my invention.

Fig. 3 is a view, partially in section, of a still further modification embodying my invention, and Fig. 4 is a view, partially in section, taken on the line IV—IV of Fig. 3, and partially in side elevation.

Referring more particularly to Fig. 1 of the drawings, I have there shown a pot or crucible 11 as partially filled with a mass of metal 12 which is to be maintained in a fluid condition. As an example of such use, type metal or lead may be mentioned. The fluid-level line in the pot or crucible is indicated at 13.

In order to heat the mass of metal 12, an immersion heater 14 is provided which embodies, more particularly, my present invention. The heater unit comprises a length of metal-encased tubular heating element 16. This heating element comprises a tubular metal casing 17 and a length of resistance wire 18 therein which may be either straight or wound to helical shape and be insulated from the metal casing 17 by any suitable refractory electric-insulating material known in the art.

One method of making such a metal-encased tubular heating unit is disclosed and claimed in reissued Patent No. 16,340 to C. B. Backer, although I do not desire to be limited to the type or construction of tubular heating element there disclosed.

The tubular heating element is bent to comprise an elongated end portion, which may be substantially of L-shape, and a coiled or return-bent portion, substantially as shown in Fig. 1 of the drawings.

A mass 19 of suitable metal is cast around the elongated portion of the heating element 16 and a relatively small portion only of its return-bent part. The amount of metal which is cast around the return-bent portion is just sufficient to maintain the tubular heating element in its initial preformed shape.

While no handle or terminal structure is shown in Fig. 1 of the drawings, I may use any suitable or desirable construction of such elements.

In Fig. 2 of the drawings, I have there shown a heating element 21 of substantially the same general construction as set forth hereinbefore, the main difference being in the shape of the intermediate portion of the heating element which comprises a plurality of parallel-extending portions having return-bent connecting portions. A mass 22 of metal is cast around the elongated portion of substantially L-shape, as well as around certain of the return-bent portions.

Referring more particularly to Figs. 3 and 4 of the drawings, a metal-encased tubular heating unit 23 comprises a substantially straight elongated end portion and an intermediate portion which is of substantially star shape and comprises a plurality of substantially straight lengths connected by return-bent portions. A mass 24 of metal is cast around the straight portion and around the inner return-bent portion, substantially as shown in the drawings.

While I have shown and described a single heating element only, I do not wish to be limited thereto as I may use more than one heating element and cast a single mass of metal therearound, in the manner set forth hereinbefore.

When metals of the kind hereinbefore mentioned are heated so that they become fluid and are maintained at that temperature in the open air for relatively long periods of time, a heater immersed therein to heat the same is subject to corrosive action at the fluid-level line, and the mass of cast metal, indicated at 19 in Fig. 1 of the drawings, will protect the heating element proper against such corrosive action. While the mass of cast metal may be attacked, it is possible to replace the corroded metal by fresh metal, but if this is not feasible or possible, it is evident that the life of the heating element will be greatly lengthened beyond that which it would have if no such cast-metal cover were provided.

It is desirable in an immersion heater, to have the shortest possible length of heat path from the resistor to the material to be heated and it is, therefore, undesirable to incase the heating element in a mass of cast metal. As this part of the heating element will be immersed substantially continuously in the fluid metal, no oxidizing action thereon will occur. It is desirable, however, that the initial preformed shape of the heating unit be maintained and I, therefore, make the mass of cast metal only of such volume and extent, relatively to the return-bent portion, as will maintain the heating element in its initial preformed shape.

My invention thus provides an immersion heating unit embodying a metal-encased tubular heating element with means for maintaining the initial preformed shape thereof and for resisting corrosive action at the fluid-level line, thereby insuring a quick heat transfer from the resistor to the material being heated and a relatively long life of the heating unit itself.

Since various modifications may be made in the device embodying my invention without departing from the spirit and scope thereof, I desire that only such limitations shall be placed thereon as are imposed by the prior art or are set forth in the appended claim.

I claim as my invention:

In an electric-heating unit, in combination, a preformed encased tubular heating element comprising an elongated portion and a return-bent portion and a mass of metal cast around the elongated portion and a part only of the return-bent portion.

In testimony whereof, I have hereunto subscribed my name this 28th day of September, 1928.

JAMES C. WOODSON.